No. 635,714.

Patented Oct. 24, 1899.

J. G. DAIGNEAU.

BACK PEDALING BRAKE.

(Application filed Feb. 21, 1899.)

(No Model.)

2 Sheets—Sheet 1.

WITNESSES:
L. M. Billings.
G. A. Neubauer.

INVENTOR
John G. Daigneau
BY
A. J. Sangster
ATTORNEY.

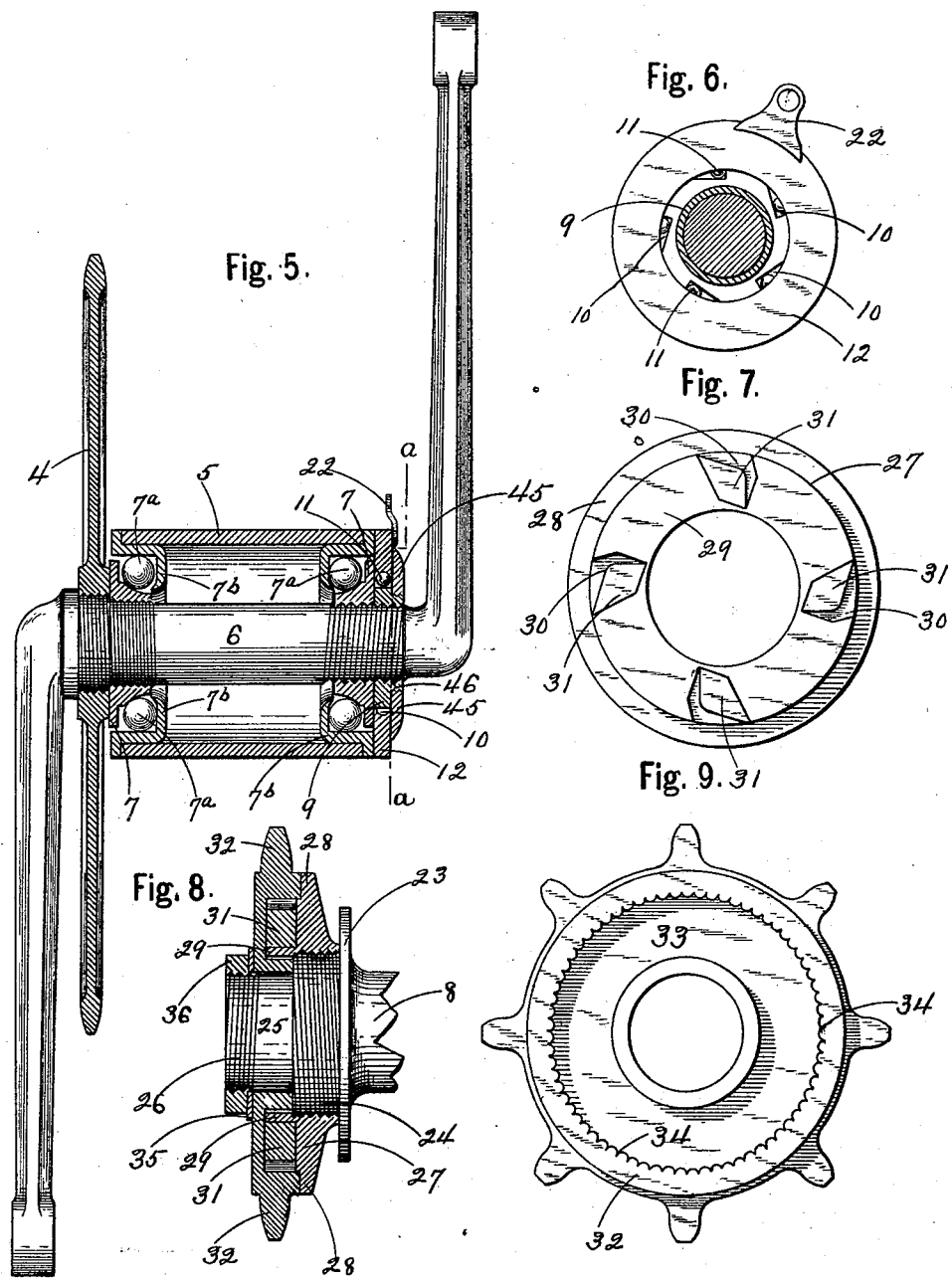

UNITED STATES PATENT OFFICE.

JOHN G. DAIGNEAU, OF BUFFALO, NEW YORK, ASSIGNOR TO HIMSELF, A. DE ETTA PEASE, AND EDWARD ZIMMERMANN, OF SAME PLACE.

BACK-PEDALING BRAKE.

SPECIFICATION forming part of Letters Patent No. 635,714, dated October 24, 1899.

Application filed February 21, 1899. Serial No. 706,326. (No model.)

*To all whom it may concern:*

Be it known that I, JOHN G. DAIGNEAU, a citizen of the United States, residing at Buffalo, in the county of Erie and State of New York, have invented certain new and useful Improvements in Back-Pedaling Brakes for Bicycles, of which the following is a specification.

My invention relates to a detachable back-pedaling brake for bicycles, which can be easily attached to or detached from any of the well-known styles of safety-bicycles without materially changing or altering the construction.

It also relates to certain details of construction, all of which will be fully and clearly hereinafter described and claimed, reference being had to the accompanying drawings, in which—

Figure 1:
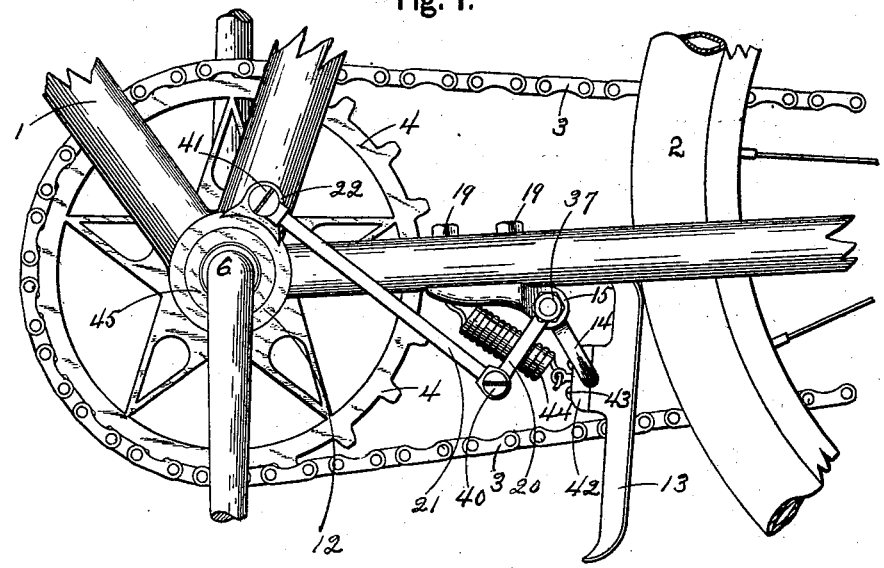
Figure 2:
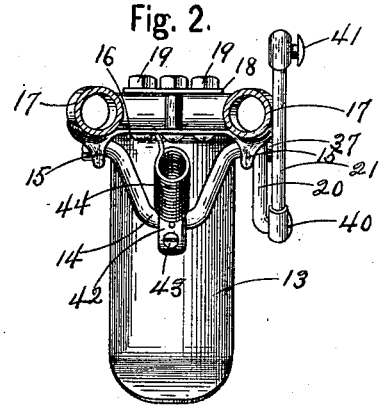
Figure 3:
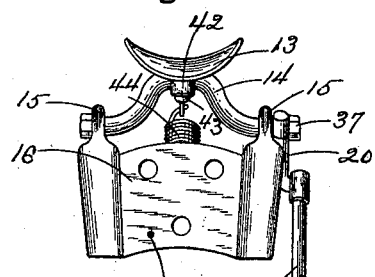
Figure 4:
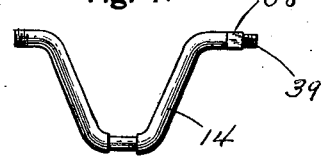

Figure 1 is a side elevation of a portion of a bicycle having my improved brake attached thereto. Fig. 2 represents a front view of the brake attachment, illustrating also a portion of the bicycle-frame in section, to which the brake is attached. Fig. 3 is a top plan view of the brake device. Fig. 4 is a detached view of the brake crank-shaft. Fig. 5 is a sectional view through a bicycle crank-hanger, illustrating the operating-clutch mounted upon the crank-shaft. Fig. 6 is an enlarged section on or about line $a\ a$, Fig. 5. Fig. 7 is an enlarged view of the clutch mounted upon the rear-wheel hub. Fig. 8 is an enlarged detached view of a portion of the rear hub, also showing the sprocket and its supporting-clutch in section. Fig. 9 represents an enlarged view of the rear sprocket.

In referring to the drawings for the details of construction, in which like numerals designate like parts, 1 represents the frame, 2 the rear wheel and its tire, 3 the chain, 4 the front sprocket, 5 the crank-hanger, 6 the bicycle crank-shaft and cranks, 7 the cones, and 8 the rear hub, all of which are of well-known construction.

My improved brake device comprises an internally screw-threaded ring 9, adapted to be rigidly screwed upon the crank-shaft in lieu of the outer lock-nut usually employed thereon and having peripheral notches or depressions 10, in which the clutch rollers or balls 11 are supported; an annular ring 12, which is supported upon the ring 9, the clutch-rollers 11 being interposed between the inner surfaces of the ring 12 and the outer notched surface of the ring 9 and acting to prevent the independent rotation of the annular ring 12 upon the ring 9 in one direction; a brake-spoon 13, pivotally mounted upon a crank-shaft 14, journaled in the ears 15 of the lower plate 16, which is adapted to be secured to the bicycle-frame by placing it against the lower surface of the horizontal tubes 17 of said frame and arranging an upper plate 18 against the upper surface and passing bolts or screws 19 through both plates to rigidly clamp them upon the frame-tubes; a crank-arm 20, extending from one of the outer ends of the brake-operating crank-shaft 14; a rod 21, pivotally connected at its respective ends to the opposite end of the crank-arm 20, and an extension or lug 22, projecting from the ring 12.

While this brake device can be easily and quickly attached to and removed from any bicycle of the usual modern construction, it can also be dismounted and its parts separated.

The crank-arm 20 is detachably secured to the shaft 14 by the nut 37, being provided with a square socket which fits over the square end 38 of the shaft to prevent rotation, the nut screwing upon the screw-threaded extension 39.

The connecting-rod 21 is pivotally secured to the crank-arm and the lugs 22 by the screw-bolts 40 and 41, respectively.

The brake-spoon is detachably secured to the center of the shaft 14 by the removable part 42, which is secured to the spoon by the screws 43, the spoon and part being provided with semicircular grooves which register to form a circular opening through which the shaft passes. To normally retain the spoon from contact with the tire, a spring 44, preferably spiral in shape, is attached at one end to the spoon and at the other to the plate 16, which is provided with an opening through which the end of the spring passes.

The clutch-ring 12 is secured against longitudinal displacement by the outer nut 45, which screws upon the outer screw-threaded reduced portion 46 of the ring 9, the outer edge of the enlarged portion forming a shoulder to limit its inward movement, and thus prevent it from locking the clutch-ring 12 against rotation. The operation of this portion of my invention will be readily understood by referring to the foregoing description and the accompanying drawings, the backward movement of the crank-shaft carrying the clutch-ring with it and through the connecting-rods, moving the brake-spoon into contact with the tire.

The clutch and its supporting-ring can be easily placed upon any crank-shaft having a lock-nut for fastening the adjusting-cone of the bearings in place, the ring acting as a lock-nut and also as a support for the clutch.

Where the shaft is provided with inner cones and a smooth-surfaced periphery near the juncture with the crank and exterior to the bearing, it is advisable to cut a screw-thread upon the periphery of the shaft to receive the supporting-ring.

The brake is secured to the frame by a clamping device, which can be attached to any of the modern styles of frames slightly in the rear of the crank-hanger.

The rear sprocket is supported upon the rear hub, so that it is capable of rotating in one direction independently of said hub. I preferably construct this portion of my invention as follows, reference being had to Figs. 7, 8, and 9: The rear hub 8 (see Fig. 8) is provided with a peripheral flange 23, to which the spokes are attached, a screw-threaded portion 24, which reduces to form the smooth-surfaced portion 25, and an outer screw-threaded portion 26, and an annular ring 27 is screwed upon the portion 24 and firmly against the flange 23. This ring has an inner flange or enlarged portion 28 and an outer reduced portion 29, which is provided with a series of peripheral notches or depressions 30, in each of which a dog 31 is supported. The sprocket 32 is provided with an annular depression or groove 33 on one side, into which the reduced portion 29 fits, (see Fig. 8,) and the outer edge 34 of the wall of the groove is notched or serrated, as shown in Fig. 9. The sprocket is secured against horizontal displacement on the hub by the washer 35 and lock-nut 36. By this construction the sprocket, although it is loosely supported upon the hub, can rotate independently thereof in one direction only, as one or more of the dogs will drop into the notches 34 when turned in a forward direction and prevent its independent movement.

I claim as my invention—

1. In a bicycle having a brake device adapted to be set by back-pedaling, the combination with its wheels, frame, crank-shaft, bearings, and a clutch device for forward driving, of a ring having a clutch mechanism adapted to be placed upon the crank-shaft in lieu of the outer lock-nut of the bearings, a plate detachably attached to the frame and having downwardly-extending ears, a supplementary crank-shaft journaled in said ears, a brake-spoon supported upon said crank-shaft, a crank-arm extending from the supplementary shaft, a rod pivotally connected at one end to said crank-arm and at the other to the clutch mechanism, and a spring for normally retaining the brake-spoon from contact with the tire of the bicycle, as set forth.

2. The combination with a bicycle, its frame, integral cranks and crank-shaft, clutch device for forward driving and the bearings having an adjusting-cone, of a lock-nut for said cone, a clutch mechanism mounted on said lock-nut and adapted to revolve in one direction independently, a plate detachably attached to the frame, a supplementary crank-shaft adapted to rock in the plate, a brake-spoon supported on said crank-shaft, a crank-arm detachably secured to the end of the supplementary shaft, a connecting-rod attached to the crank-arm and the clutch mechanism and a spring for normally retaining the brake-spoon from contact with the tire.

3. In a bicycle having a brake adapted to be set by back-pedaling, the combination with the frame, front and rear wheels, a clutch device for forward driving, crank-shaft, and the bearings having an adjustable part, of a lock-nut for said adjustable part having peripheral notches, an annular ring mounted upon said lock-nut, balls or rollers supported in the peripheral notches and interposed between the lock-nut and ring, an upper and lower plate adapted to be clamped to the frame, said lower plate having downwardly-extending ears, a supplementary crank journaled in said ears, a brake-spoon mounted upon said supplementary crank-shaft, a crank-arm extending from one of the outer ends of the crank and a connecting-rod at its ends pivoted to the opposite end of said crank-arm and the annular ring respectively, as set forth.

4. In a bicycle having a brake adapted to be set by back-pedaling, the combination with the frame, front and rear wheels, clutch device for forward driving, crank-shaft bearings having an adjustable part, of a lock-nut for said adjustable part having peripheral notches, an annular ring mounted upon said lock-nut, balls or rollers supported in the peripheral notches, and interposed between the lock-nut and ring, an upper and lower plate adapted to be clamped to the frame, said lower plate having downwardly-extending ears, a supplementary crank journaled in said ears, a brake-spoon mounted upon said supplementary crank-shaft, and having an extension provided with a semicircular groove and an outer removable part also provided with a semicircular groove which registers to form a circular opening through which the supplementary crank-shaft passes, a crank-arm extending from one of the outer ends of the crank-arm and a connecting-rod at its ends pivoted to the opposite end of said crank-arm and the annular ring respectively, as set forth.

JOHN G. DAIGNEAU.

Witnesses:
L. M. BILLINGS,
G. A. NEUBAUER.